3,709,818
CONDENSATE POLISHING
Hilding B. Gustafson and Howard W. Frazer, Tucson, Ariz., assignors to Westinghouse Electric Corporation, Pittsburgh, Pa.
No Drawing. Filed Oct. 1, 1969, Ser. No. 862,919
Int. Cl. B01d 15/06
U.S. Cl. 210—32                        15 Claims

ABSTRACT OF THE DISCLOSURE

This invention relates to the regeneration of anion exchange resins used in mixed ion exchange resin bed demineralizers wherein the resins are separated, the anion exchange resin fraction regenerated with an alkali metal compound, and the regenerated resins admixed to reform the mixed bed. Specifically, the invention comprises treatment of the anion exchange resin fraction after regeneration to replace the alkali metal cation associated with the cation exchange resin present in the anion exchange resin fraction with an alkaline earth metal cation selected from the group consisting of calicum, barium, strontium, and mixtures thereof, and removing the alkali metal cation from the fraction prior to admixture of the resins to reform the mixed bed.

BACKGROUND OF THE INVENTION

In the operation of steam plants and in other operations wherein water is utilized for steam generation or other purposes, it is common practice to add ammonia, or other compound, to adjust the pH of the water and minimize corrosion. Also, ion exchange resins are used to remove solid materials present in the water and to remove certain ions which act to corrode the equipment or which become deposited on the surfaces thereof and thereby minimize their effectiveness. Most commonly, such resins are employed as mixed beds of an anion exchange resin and a cation exchange resin. In operation, it is evident that after certain periods of time, the resins become spent and must be regenerated. For purposes of regeneration the resins are first separated after preferably having been backwashed to remove solids filtered out of the system water by the resins. The anion resin is then regenerated with an alkali metal compound, such as sodium hydroxide, and the cation resin with an acid. The regenerated resins are then admixed to reform the bed. All of the foregoing is conventional and illustrated in U.S. Letters Patents Nos. 3,336,747, 3,385,788, and 3,414,508. As set forth in the latter two patents, the separation of the resins is incomplete and a significant amount of the cation exchange resin is present in the anion exchange resin fraction.

Heretofore, the presence of the cation exchange resins in the anion exchange resin fraction has presented a serious problem of alkali metal ion, particularly sodium, contamination of the water used in the process. This comes about due to the fact that the anion exchange resins are regenerated by the use of an alkali metal compound, usually caustic soda. This caustic soda results in conversion of the cation exchange resin in the anion exchange resin fraction to the sodium form, which sodium is released into the system water when ammonia breakthrough occurs after the cation exchange resin is converted to the ammonia form by the ammonia added to adjust the pH. This sodium leakage is a major contaminant and a serious source of corrosion to and/or deposition on the equipment. Reference to Pats. Nos. 3,385,787 and 3,414,508 shows the various attempts made to minimize or to eliminate this problem. The inadequacies of the techniques used in Pat. No. 3,414,508 are set forth in Pat. No. 3,385,787, which makes clear that it is not possible to completely separate the anion and cation exchange resins prior to regeneration and that, consequently, sodium is still passed into the water due to action of the ammonia after regeneration and admixture of the resins. In an attempt to overcome these drawbacks, Pat. No. 3,385,787, after regeneration of the anion exchange resin with caustic, washes the thus treated resin with large amounts of ammonia in order to transform the sodium form of the cation exchange resin present in the anion exchange fraction to the ammonia form. This process is unsatisfactory in that even the patentees acknowledge that there is a large waste of ammonia to eliminate relatively small amounts of sodium and, furthermore, all the sodium is not removed.

SUMMARY OF THE INVENTION

The instant invention provides for the positive elimination of substantially all of the alkali metal cations, particularly sodium, from the cation exchange resin portion of the anion exchange resin fraction and also insures that the cation replacing the sodium cannot be displaced by the ammonia or other compound added to maintain the pH of the recirculating water in the operation.

Briefly stated, the present invention comprises treating the regenerated anion exchange resin fraction to replace the alkali metal cation contained in the cation exchange resin present in the anion exchange resin fraction with an alkaline earth metal cation selected from the group consisting of calcium, barium, strontium, and mixtures thereof and removing the alkali metal cation from the anion exchange resin fraction.

DETAILED DESCRIPTION

This invention is directed to the method of regenerating anion exchange resin in a mixed bed demineralizer in order to insure that there is no sodium leakage into the system after the regenerated anion exchange resin is admixed with the regenerated cation exchange resin to reform the mixed bed. Thus, the process is utilizable with any of the conventional mixed bed demineralizing equipment such as disclosed in Pats. Nos. 3,336,747, 3,385,787 and 3,414,508, and such equipment itself does not form any part of the instant invention.

With respect to the anion exchange resins, the instant invention is particularly directed to anion exchange resins used in the demineralization of water which are of the type requiring an alkali metal regenerant, usually sodium hydroxide. Such resins are well known, specific examples being the quaternary ammonium exchange resins based on a styrene-divinyl benzene copolymer matrix and available under the trade names Dowex, SBR and SBRP and Amberlite IRA–900.

In like manner, strongly acidic cation exchange resins commonly used in the demineralization of water are operative in the instant process. Thus, resins that will be ultimately in the ammoniated state or in the form of an aliphatic amine can be used. Some specific examples are those produced from styrene-divinylbenzene, polystyrene, or sulfonated copolymers of styrene and divinylbenzene and available commercially as Amberlite 200 and Dowex HCR, HCR–W, HGR, and HGR–W.

What is essential in the instant process is the replacement of the alkali metal cation present in the regenerated anion exchange resin with an alkaline earth metal cation selected from the group consisting of calcium, barium, strontium, and mixtures thereof. This is accomplished by treating the regenerated anion exchange resin with a hydroxide of the alkaline earth metals listed, the use of an aqueous solution thereof being preferred. These compounds are sufficiently soluble and are not replaced by the ammonia. Salts of the listed metals are not suitable since the anion portion thereof will exhaust the anion exchange resin.

Calcium hydroxide is the preferred hydroxide. The barium hydroxide and strontium hydroxide are more soluble but costlier, and, hence, not as commercially desirable.

In accordance with the instant invention, the spent bed of ion exchange resins is separated as by any conventional method to provide a fraction consisting mainly of the anion exchange resin and a fraction consisting primarily of the cation exchange resin. The cation exchange fraction is treated in the usual manner with an acid regenerant and such treatment forms no part of the instant invention. In the regeneration of the anion exchange fraction, however, after it has been treated with the caustic regenerant, the regenerated anion resin is treated with the alkaline earth metal hydroxide in an amount sufficient and for a time sufficient to completely replace the sodium contained in the cation exchange resin present in this anion exchange resin fraction.

This treatment causes the sodium to be replaced by the alkaline earth action, which cation is not replaced by ammonia when ammonia breakthrough occurs. Nor is it replaced by other materials, used to adjust the pH of the system water to prevent corrosion.

It is common practice in this industry to report chemical usage in terms of pounds of chemical per cubic foot of resin, which resins are shipped moist and kept moist because drying can be harmful. A cubic foot of anion resin weighs about 42 pounds, and on this basis, the sodium hydroxide is used in the proportion of about 2 pounds to about 15 pounds, and preferably 6 pounds to about 10 pounds per cubic foot of resin. Preferably an aqueous solution of the sodium hydroxide concentration of about 2 percent to 4 percent is used with about 250 pounds of such solution being used to treat each cubic foot of resin.

In order to effect replacement of the alkali metal cation, the alkaline earth metal, in the form of the hydroxide, must be used in an amount at least stoichiometrically equivalent to the amount of sodium in the cation exchange resin present in the anion exchange resin fraction. In usual commercial operation when there is separation of the bed to regenerate the resin, from about 1 percent to about 5 percent, and in some cases much higher amounts of cation exchange resin is present in the anion exchange resin fraction. To avoid the need for testing for such sodium and to insure the replacement of the alkali metal compound it is, therefore, most desirable to use an amount of the alkaline earth metal hydroxide several times the stoichiometric amount required after assuming the poorest separation.

The time required to replace the alkali metal cation is dependent, in the main, upon the flow of the alkaline earth metal cation solution or suspension through the anion exchange resin. In ordinary commercial practice about one-half hour is suitable. Periods as low as ten minutes can also be used with the proper flow as, of course, can times longer than one-half hour. In most commercial operations the longer periods of time are not desired.

The exchange of the cation for the sodium or potassium can be accomplished simply by passing a solution or suspension of the alkaline earth metal hydroxide through the bed of regenerated anion exchange resin. After this treatment with the alkaline earth metal compound, the anion exchange fraction is processed in the usual manner, such as being stored for future use or being admixed with the cation exchange resin in reforming the mixed bed of resin for demineralization.

The invention will be further described in connection with the following examples of the practice of it which are set forth for the purpose of illustration only and wherein proportions are in parts by weight unless specifically stated to the contrary.

Example I

Three resins were prepared as follows:

(1) A strong acid cation resin (Dowex HCR–W) was partially ground and wet screened to secure a product of which about 50 percent was bead fragments finer than U.S. 50 screen and 50 percent broken beads and whole beads coarser than U.S. 50 screen. This material then was placed fully in the sodium form by regeneration with a large excess of sodium hydroxide after which the material was thoroughly rinsed with pure water.

(2) A strong base anion resin (Dowex SBRP) as received from the manufacturer was carefully regenerated using the equivalent of 50 pounds of sodium hydroxide (NaOH) per cubic foot of resin and then thoroughly rinsed with pure water. The purpose of this regeneration was to fully convert the resin to the free base form.

(3) Additional Dowex HCR–W, as received from the manufacturer, was thoroughly regenerated to the hydrogen form by carefully treating with the equivalent of 100 pounds of sulfuric acid ($H_2SO_4$) per cubic foot of resin and then rinsing with pure water.

8.3 ml. of (2) and 0.32 ml. of (1) were mixed and transferred to a container. A dilute solution of calcium hydroxide was prepared, filtered to remove insolubles. This solution contained 2.2 mg. calcium hydroxide calculated as calcium carbonate per 2.0 ml. 100 ml. of this lime solution was allowed to flow through the resin bed in the container in a period of seven minutes. The effluent was titrated and 1.4 mg. calcium hydroxide calculated as calcium carbonate per 2 ml. was found therein. When the remainder of the effluent was recycled through the resin bed, no further removal of calcium hydroxide occurred. The amount of removal occurring in the resin bed thus amounted to (2.2−1.4) 50=40 mg. The resin was rinsed with pure water, removed from the container and 8.3 ml. of (3) added to the lime treated resin. The resins were blended and returned to the container. 3 liters of dilute ammonia solution were prepared by adding 3.9 ml. of reagent grade strong ammonia, having specific gravity 0.9 and containing 29 percent $NH_3$, to pure water and making up to 3 liters. This quantity of ammonia is sufficient to exhaust the 8.3 ml. of (3) several times. The 3 liters of dilute ammonia were allowed to flow slowly through the resin bed. The first liter of effluent contained 200 p.p.b. of hardness, the second liter 50 p.p.b. and the third liter 50 p.p.b. The total amount of calcium carbonate hardness removed from the resin bed thus was 0.3 mg. relative to the 40 mg. placed in the resin bed by the lime treatment. The concentration of ammonia in the diluted ammonia solution was over 300 p.p.m. and this concentration is over 100 times the ammonia concentration used in power plants for corrosion control purposes. A quantity of the ammonia solution was diluted 100 times with pure water thus securing an ammonia concentration of about 3 p.p.m. Some of this 3 p.p.m. solution was passed through the resin bed, the effluent solution concentrated by evaporation in a Teflon lined pan, and it was found that the concentration in the effluent prior to evaporation was less than 1 p.p.b. calcium carbonate hardness.

Example II

A commercial size mixed bed condensate polisher was used containing 44 cubic feet Dowex SBRP plus 88 cubic feet Dowex HCR–W which was operating with the anion resin in the hydroxide form and with the cation resin in the hydrogen form. The regenerants used were sodium hydroxide and sulfuric acid. This condensate polisher was being operated to a conductivity breakthrough, i.e. as soon as the conductivity of the effluent increased, the bed was taken out of service and regenerated. The influent contained about 1 p.p.m. of ammonia. As long as operation was in this manner, there was no sodium in the effluent. However, when the mixed bed condensate polisher was kept in service beyond the conductivity breakthrough such that ammonia appeared in the effluent, the usual prohibitive rise in sodium occurred.

A total of 43 pounds of calcium hydroxide ($Ca(OH)_2$) in the form of a solution having a concentration of about 1 gram per liter was allowed to flow through the anion fraction of this mixed bed in a period of 25 minutes followed by thorough rinsing with pure water. Prior to the application of the lime, the anion bed had been regenerated with caustic soda solution and rinsed with pure water. The cation fraction was regenerated with sulfuric acid and rinsed whereafter the fractions were combined and placed in operation treating about 2000 g.p.m. of condensate. Table A, below, is a tabulation of the results obtained after this regeneration.

TABLE A

| Days in service | Influent $NH_3$ (p.p.m.) | Effluent $NH_3$ (p.p.m.) | Na (p.p.b.) | Ca (p.p.b.) |
|---|---|---|---|---|
| Placed into service | | | | 0 |
| 1 | 0.95 | 0.0 | 0.6 | |
| 3 | 1.0 | 0.05 | 2.0 | |
| 4 | 0.95 | 0.45 | 2.0 | |
| 5 | 1.3 | 0.99 | 2.5 | |
| 6 | 1.25 | 1.05 | 0.0 | 0 |
| 7 | 1.45 | 1.40 | 2.1 | |
| 8 | 0.95 | 0.975 | 3.0 | |
| 9 | 1.25 | 1.25 | 2.0 | |
| 10 | 1.13 | 1.13 | 1.0 | |
| 11 | 1.22 | 1.22 | 1.5 | |
| 12 | 0.92 | 0.92 | 1.5 | |
| 14 | 1.15 | 1.15 | 1.5 | |
| 16 | 1.61 | 1.62 | 1.0 | |
| 18 | 1.53 | 1.55 | 0.5 | |
| 20 | 0.64 | 0.64 | 1.0 | |
| 22 | 1.11 | 1.13 | 1.5 | |
| 24 | 2.47 | 2.47 | 1.0 | |
| 26 | 1.09 | 1.09 | 0.5 | |
| 28 | 0.55 | 0.55 | 0.5 | |

Though ammonia breakthrough started on the third day and continued until it matched the levels of the influent, at which point the ammonia addition to the system water was greatly reduced, sodium leakage was so minimal that the polisher was used an additional 25 days without necessity for shutdown due to sodium leakage.

Example III

With respect to the use of barium hydroxide and strontium hydroxide, it is contemplated that the best mode for their use is to use the condenser, resins, and conditions set forth in Example II, except that the calcium hydroxide there used is replaced by an equivalent amount, separately and in turn, of barium hydroxide and strontium hydroxide.

It will be understood that it is intended to cover all changes and modifications of the examples of the invention herein chosen for the purpose of illustration which do not constitute departures from the spirit and scope of the invention.

What is claimed is:

1. In the process of regenerating the anion and cation exchange resins of a mixed bed demineralizer used to purify an aqueous solution wherein the mixed bed of resins is separated into two fractions, one predominantly of the anion exchange resin and the other predominantly of the cation exchange resin, each of the fractions is regenerated, the anion exchange resin fraction regenerated by an alkali metal compound, and the regenerated fractions admixed to reform the mixed bed, the improvement comprising replacing the alkali metal cation contained in cation exchange resin present in the anion exchange resin fraction with an alkaline earth metal cation selected from the group consisting of calcium, barium, strontium, and mixtures thereof.

2. The process of claim 1 wherein the alkaline earth metal cation is calcium.

3. The process of claim 1 wherein the alkali metal cation is replaced by treating the anion exchange resin fraction with a hydroxide selected from the group consisting of calcium hydroxide, barium hydroxide, strontium hydroxide, and mixtures thereof.

4. The process of claim 3 wherein the hydroxide used is calcium hydroxide in the form of an aqueous solution.

5. The process of claim 3 wherein the hydroxide is used in an amount at least stoichiometrically equivalent to the alkali metal cation present in the cation exchange resin present in the anion exchange resin fraction.

6. In a condensate purification process involving the flow of condensate through a demineralizer containing a mixed bed of anion and cation exchange resin thereby to effect the removal of anions and cations from said condensate, the method of regenerating said mixed bed whereby sodium leakage therefrom is substantially reduced, the method comprising the steps of resolving said mixed bed into a first layer, a major portion of which comprises anion exchange resin particles and a minor portion of which comprises entrained cation exchange resin particles, and a second layer comprising cation exchange resin particles, contacting at least said first layer with caustic solution to effect the regeneration thereof, contacting said first layer with lime solution to displace sodium ions with calcium ions on said entrained cation exchange resin particles, contacting said second layer with acid to effect the regeneration thereof, removing excess acid from said second layer and co-mixing said first layer and said second layer to form said mixed bed.

7. The method of claim 6 wherein said first layer is separated from said second layer prior to regenerating said layers.

8. The method of claim 6 wherein said mixed bed is resolved into said first layer and said second layer by means of backwashing and settling.

9. The method of claim 6 wherein said first layer is regenerated with an aqueous solution of sodium hydroxide.

10. The method of claim 6 wherein the concentration of lime solution ranges between about 0.026 and about 0.029 N.

11. The method of claim 6 wherein said first layer is contacted with an excess of said lime solution.

12. The method for regenerating a demineralizer containing a mixed bed consisting of anion exchange resin particles and cation exchange resin particles of greater density than said anion exchange resin particles, comprising the steps of backwashing said demineralizer to expand and float said bed and to stratify said bed into an upper and lower layer, said lower layer consisting essentially of cation exchange resin particles and said upper layer consisting essentially of said anion exchange resin particles and a minor proportion of entrained cation exchange resin particles, separating said upper and said lower layers, contacting said lower bed particles with acid, contacting said upper layer particles with a caustic solution thereby to effect regeneration of said anion exchange resin particles, contacting said upper layer particles with a basic solution containing cations selected from the group of cations consisting of barium, calcium and strontium whereby said cations readily replace the sodium cations held by the entrapped cation exchange resin particles washing said upper layer particles to remove excess caustic therefrom, and washing said lower layer particles to remove excess cation regenerant therefrom, and mixing said upper layer and said lower layer particles thereby to form a mixed ion exchange bed.

13. The method of claim 12 wherein after caustic regeneration, said upper layer particles are contacted with a basic solution containing cations selected from the group of cations consisting of barium and calcium.

14. The method of claim 12 wherein after caustic regeneration, said upper layer particles are contacted with a solution of calcium hydroxide.

15. The method of claim 14 wherein said upper layer particles are contacted with an excess of said calcium hydroxide solution required to replace the sodium ions held by said entrained cation exchange resin particles.

References Cited

UNITED STATES PATENTS

| | | | |
|---|---|---|---|
| 3,385,787 | 5/1968 | Crits et al. | 210—33 X |
| 3,388,058 | 6/1968 | Wirth | 210—37 X |
| 3,414,508 | 12/1968 | Applebaum et al. | 210—37 X |
| 3,501,401 | 3/1970 | Calmon | 210—33 |

REUBEN FRIEDMAN, Primary Examiner

T. G. WYSE, Assistant Examiner

U.S. Cl. X.R.

210—33, 37, 38